US012578060B2

(12) United States Patent
Petiot et al.

(10) Patent No.: US 12,578,060 B2
(45) Date of Patent: Mar. 17, 2026

(54) HYDROGEN TANK PROVIDED WITH A GASEOUS HYDROGEN CAPTURE SYSTEM

(71) Applicant: Airbus SAS, Blagnac (FR)

(72) Inventors: Caroline Petiot, Blagnac (FR); Stéphane Bechtel, Blagnac (FR)

(73) Assignee: Airbus SAS, Blaganc (FR)

( * ) Notice: Subject to any disclaimer, the term of this patent is extended or adjusted under 35 U.S.C. 154(b) by 565 days.

(21) Appl. No.: 17/991,905

(22) Filed: Nov. 22, 2022

(65) Prior Publication Data

US 2023/0160535 A1 May 25, 2023

(30) Foreign Application Priority Data

Nov. 25, 2021 (FR) ...................................... 2112478

(51) Int. Cl.
*F17C 11/00* (2006.01)
*F17C 1/06* (2006.01)

(52) U.S. Cl.
CPC .............. *F17C 11/005* (2013.01); *F17C 1/06* (2013.01); *F17C 2203/0624* (2013.01);
(Continued)

(58) Field of Classification Search
CPC .. F17C 11/005; F17C 1/06; F17C 2203/0624; F17C 2203/066; F17C 2203/0673; F17C 2221/012; F17C 2223/0123; F17C 2260/036; F17C 13/123; F17C 2201/0104; F17C 2201/054; F17C 2203/0607; F17C 2203/0619; F17C 2223/0161; F17C 2227/0302; F17C 3/04; F17C 2201/056; F17C 2203/0304; F17C 2203/0617;
(Continued)

(56) References Cited

U.S. PATENT DOCUMENTS 3,921,844 A * 11/1975 Walles .................. F17C 13/001
428/35.9
4,239,827 A * 12/1980 Notaro ...................... F17C 3/08
428/323

(Continued)

FOREIGN PATENT DOCUMENTS

DE 102016220995 A1 4/2018
WO 02088593 A1 11/2002

(Continued)

OTHER PUBLICATIONS

French Search Report dated Jun. 13, 2022; priority document.

*Primary Examiner* — Dung H Bui
(74) *Attorney, Agent, or Firm* — Greer, Burns & Crain, Ltd.

(57) ABSTRACT

A hydrogen tank, preferably a tank for storing liquid hydrogen at low pressure in cryogenic condition, includes at least one gaseous hydrogen capture system. The system is provided with absorbent fillers configured to capture the gaseous hydrogen, the absorbent fillers being linked to at least a part of a wall of the tank, and/or to a skin arranged on an outer face of the tank, and/or to an outer jacket intended to implement an auxiliary function. The system has a reduced weight and is able to retain and store gaseous hydrogen which could escape from the tank so as to prevent it from being given off into the environment of the tank. The captured gaseous hydrogen is able to be restored later by the system.

15 Claims, 3 Drawing Sheets

(52) U.S. Cl.
CPC .................... *F17C 2203/066* (2013.01); *F17C 2203/0673* (2013.01); *F17C 2221/012* (2013.01); *F17C 2223/0123* (2013.01); *F17C 2260/036* (2013.01)

(58) Field of Classification Search
CPC ........ F17C 2203/0663; F17C 2203/068; F17C 2223/033; F17C 2227/0383; F17C 2250/0626; F17C 2260/012; F17C 2260/037; F17C 2260/042; F17C 2270/0189; Y02E 60/32
See application file for complete search history.

(56) References Cited

U.S. PATENT DOCUMENTS 4,385,019 A * 5/1983 Bernstein ............. G02B 6/4492 252/181.7
4,388,810 A * 6/1983 Guilhem ................... F17C 3/10 62/54.3
5,225,812 A * 7/1993 Faghri ................... G01M 3/186 220/900
5,476,189 A * 12/1995 Duvall ...................... F17C 1/16 220/62.19
5,547,533 A * 8/1996 Berglund ............ B29C 66/1162 156/169
5,662,729 A * 9/1997 Nishimura .............. B22F 1/052 420/455
5,772,938 A * 6/1998 Sharp ................... B65D 90/029 264/285
7,641,949 B2 * 1/2010 DeLay .................. B29C 53/602 220/586
8,657,146 B2 * 2/2014 Schultheis ............... F16J 12/00 220/651
8,931,661 B2 * 1/2015 Kuroiwa ................. B29C 70/32 220/660
11,346,499 B1 * 5/2022 Joubert Des Ouches .................. F17C 1/06
2004/0149759 A1 8/2004 Moser et al.
2007/0205201 A1 * 9/2007 Cundiff ..................... F17C 1/06 220/591
2008/0121643 A1 5/2008 Blencoe et al.
2008/0305369 A1 * 12/2008 Muraki ............. H01M 8/04089 429/413
2009/0057319 A1 * 3/2009 Schlag .............. B29C 49/04102 220/586
2009/0127137 A1 5/2009 Golz et al.
2009/0314785 A1 * 12/2009 Cronin .................. B29C 53/602 156/305
2012/0018314 A1 * 1/2012 Friedlmeier .............. F17C 1/06 206/0.6
2012/0048865 A1 * 3/2012 Eihusen ................ F17C 13/002 220/586
2013/0298532 A1 * 11/2013 Hamad .................. B01D 53/62 60/274
2013/0341235 A1 * 12/2013 Leavitt ..................... F17C 13/00 206/524.2
2015/0144085 A1 * 5/2015 Inubushi ................. F02B 43/02 546/5
2015/0274006 A1 * 10/2015 Chung ............. B60K 15/03006 264/46.7
2016/0031182 A1 * 2/2016 Quinn .................. D03D 25/005 428/113
2018/0172207 A1 * 6/2018 Uehara ...................... F17C 1/06
2019/0128475 A1 * 5/2019 Roland ...................... F17C 1/16
2019/0248229 A1 8/2019 Pelger et al.
2019/0277452 A1 * 9/2019 Despres .................. F17C 11/00
2020/0088318 A1 * 3/2020 Scannell .................... F16K 1/02
2020/0385267 A1 * 12/2020 Kambara .................. C01B 3/50
2021/0033246 A1 * 2/2021 Robinet ................ C01B 3/0026
2021/0123568 A1 * 4/2021 Kronholz .................. F17C 1/16
2021/0260994 A1 * 8/2021 Gambone .............. B62D 21/02
2021/0332947 A1 * 10/2021 Hatta ..................... B29C 70/025
2022/0381403 A1 * 12/2022 Ehgartner ................. F17C 3/08
2023/0008726 A1 * 1/2023 Stahl ...................... F17C 13/084
2023/0021098 A1 * 1/2023 Yamanaka ........ H01M 8/04029
2024/0027024 A1 * 1/2024 Matsumoto ............. C08L 63/00
2025/0027617 A1 * 1/2025 Mahnken .................. F17C 1/06
2025/0052369 A1 * 2/2025 Kioschis ............... F17C 13/002

FOREIGN PATENT DOCUMENTS

WO 2007124825 A1 11/2007
WO 2008033740 A2 3/2008

* cited by examiner

HYDROGEN TANK PROVIDED WITH A GASEOUS HYDROGEN CAPTURE SYSTEM

CROSS-REFERENCES TO RELATED APPLICATIONS

This application claims the benefit of the French patent application No. 2112478 filed on Nov. 25, 2021, the entire disclosures of which are incorporated herein by way of reference.

FIELD OF THE INVENTION

The present invention relates to a hydrogen tank, in particular a liquid hydrogen tank, provided with a gaseous hydrogen capture system comprising absorbent fillers, and a method for restoring gaseous hydrogen captured by the absorbent fillers of the hydrogen tank.

Although not exclusively, the present invention applies more particularly to a liquid hydrogen tank, and notably to a liquid hydrogen tank with which an aircraft, and, in particular, a transport airplane, is equipped.

BACKGROUND OF THE INVENTION

It is known that hydrogen at ambient temperature and pressure is in gaseous form. This gaseous state is not suitable for storage in this type of application since, because the hydrogen is not dense, it entails providing a very large tank volume or a high pressure to be able to contain a significant quantity of hydrogen. One solution to remedy this problem consists in storing the hydrogen in the liquid state, by maintaining it at very low temperature (at −253° C.), in a hermetically closed container, the hydrogen being a particularly volatile component.

In the case of a liquid hydrogen tank for an aircraft for which the weight is a not inconsiderable factor, it is possible to envisage using a composite material instead of a metal to produce the wall of the tank. However, in the context of the development of a structure made of laminated composite material for a wall of a tank intended for the storage of liquid hydrogen, the risk of leaks caused by the repeated thermomechanical loadings which create damage (transverse cracking, matrix solubility) seems particularly difficult with regard to the evaporation of the hydrogen.

Gaseous hydrogen released in an uncontrolled manner could present a hazard for safety, notably because of the instability of this gas in the environment outside the tank. In this context, it appears necessary to prevent hydrogen atoms escaping from a tank exhibiting leaks from being located in the atmosphere of the aircraft, which would in fact be unfortunate both for the aircraft and for the passengers.

There are few solutions which make it possible to achieve this objective while having an acceptable weight for use on an aircraft. The normal solutions for hydrogen storage on land rely, generally, on a dynamic principle with a system incorporated in a double tank jacket, which produces a dynamic purging under pressure conditions (including a vacuum) to discharge the hydrogen to the outside. These usual solutions require ongoing drainage action which can pose problems of maintenance of the purge equipment, of supply by an electrical or other source, and of leaks. These usual solutions are not therefore fully satisfactory for use on an aircraft.

There is therefore a need to have a solution that makes it possible to recover the gaseous hydrogen which could escape from a hydrogen tank, while having a reduced weight acceptable for the applications envisaged.

SUMMARY OF THE INVENTION

The present invention relates to a hydrogen tank, in particular a liquid hydrogen tank, notably for an aircraft, which makes it possible to address this need.

For this, according to the invention, the hydrogen tank comprises at least one gaseous hydrogen capture system provided with absorbent fillers capable of capturing gaseous hydrogen.

Thus, by virtue of the invention, there are provided, on the hydrogen tank, absorbent fillers specified hereinbelow, which are capable of absorbing, that is to say, retaining and storing, gaseous hydrogen which could escape from the tank so as to prevent it from being given off into the environment of the tank, for example in an aircraft in the case of a hydrogen tank of an aircraft. Furthermore, by the use of absorbent fillers, the weight of the gaseous hydrogen capture system is reduced because of the nanometric size associated with a low density, and it is notably acceptable for the application envisaged on an aircraft. The gaseous hydrogen capture system also has other advantages specified hereinbelow, including the possibility of controlling the flow rate of the leaks and/or of restoring the captured gaseous hydrogen.

In the context of the present invention, the gaseous hydrogen capture system, that is to say, the absorbent fillers, can be arranged at different points with respect to the tank, in particular in a wall of the tank, on the tank and/or around the tank, as specified hereinbelow.

In a first embodiment, at least some of the absorbent fillers are linked to at least a part of a wall of the tank, by being, in particular, either embedded in the wall, or incorporated in the outer surface of the wall.

Furthermore, in a second embodiment, as a variant of or complementing the first embodiment, at least some of the absorbent fillers are linked to a skin (or shell) arranged on at least a part of an outer face of the tank.

Furthermore, in a third embodiment, as a variant of or complementing the first and second embodiments, the hydrogen tank comprises an outer jacket intended to implement an auxiliary function, notably a heat insulation function, and at least some of the absorbent fillers are linked to at least a part of the outer jacket.

Moreover, in a preferred embodiment, the hydrogen tank comprises at least one composite material (provided with fibers and resin), on the wall, a skin and/or an outer jacket (notably a thermal insulation jacket). In this preferred embodiment, advantageously:

- at least some of the absorbent fillers are incorporated in at least some of the fibers of the composite material, namely in the material of the fibers or on the surface of the fibers; and/or
- at least some of the absorbent fillers are embedded in the resin; and/or
- at least some of the absorbent fillers are deposited on at least one surface of the composite material.

Moreover, in a particular embodiment, for which the hydrogen tank comprises at least one laminated composite provided with at least one composite layer formed by plies, advantageously:

- at least some of the absorbent fillers are incorporated in at least one absorbent layer arranged between two successive plies of the composite layer;

and/or at least some of the absorbent fillers are directly incorporated in at least one of the plies.

Furthermore, in a particular embodiment, the gaseous hydrogen capture system comprises particles of thermosetting or thermoplastic polymers which incorporate the absorbent fillers.

Moreover, advantageously, the absorbent fillers are distributed uniformly.

Furthermore, advantageously, the absorbent fillers exhibit a variable efficiency as a function of the temperature, the temperature on the hydrogen tank is variable and lies within a range of temperatures, and the absorbent fillers are arranged on the tank at locations where the temperature is such that the absorbent fillers exhibit the highest efficiency for the range of temperatures.

Moreover, advantageously, the absorbent fillers, which correspond to porous components having a high specific surface, are produced in at least one of the following materials: porous carbonated elements, metal-organic frameworks, covalent organic frameworks.

The present invention relates also to a method for restoring gaseous hydrogen captured by absorbent fillers of a hydrogen tank such as that described above.

According to the invention, the method comprises at least one restoration step consisting in bringing the gaseous hydrogen capture system (provided with the absorbent fillers) of the hydrogen tank into conditions generating a release of the gaseous hydrogen absorbed previously by the absorbent fillers.

Advantageously, the restoration step comprises at least one of the following operations, implemented at least on the gaseous hydrogen capture system:

a temperature increasing operation;

a pressure reducing operation;

a gas, preferably neutral, diffusion operation;

an operation leading to the modification of the polarity of the inner wall of pores of the porous absorbent fillers.

BRIEF DESCRIPTION OF THE DRAWINGS

The attached figures will give a good understanding of how the invention can be produced. In these figures, identical references denote similar elements.

DETAILED DESCRIPTION OF THE PREFERRED EMBODIMENTS

Figure 1:
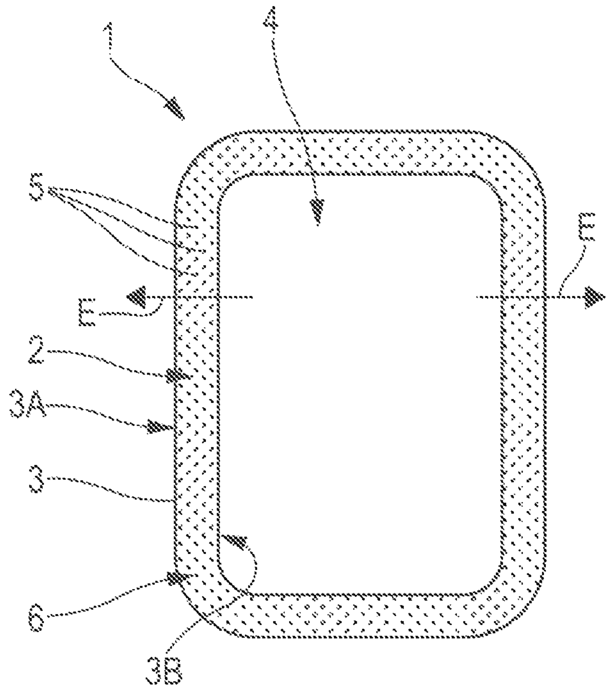
FIG. 1 is a schematic view, in cross-section, of a hydrogen tank provided with a gaseous hydrogen capture system arranged in a wall of the tank.
Figure 2:
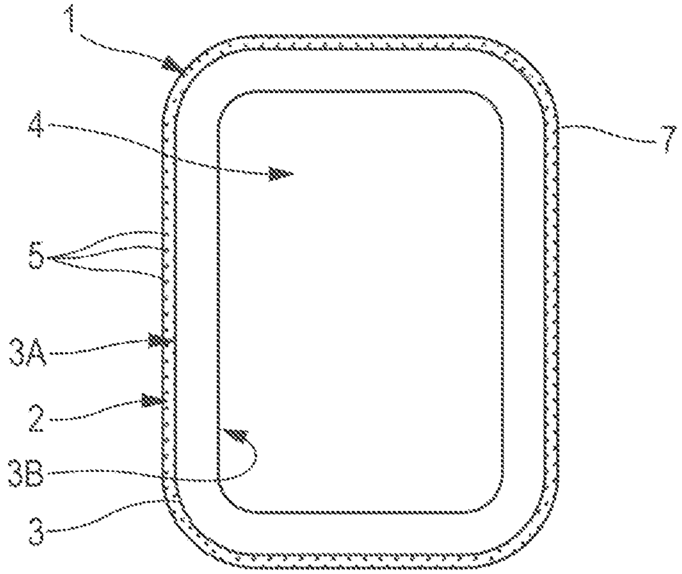
FIG. 2 is a schematic view, in cross-section, of a hydrogen tank provided with a gaseous hydrogen capture system arranged in a skin covering the wall of the tank.
Figure 3:
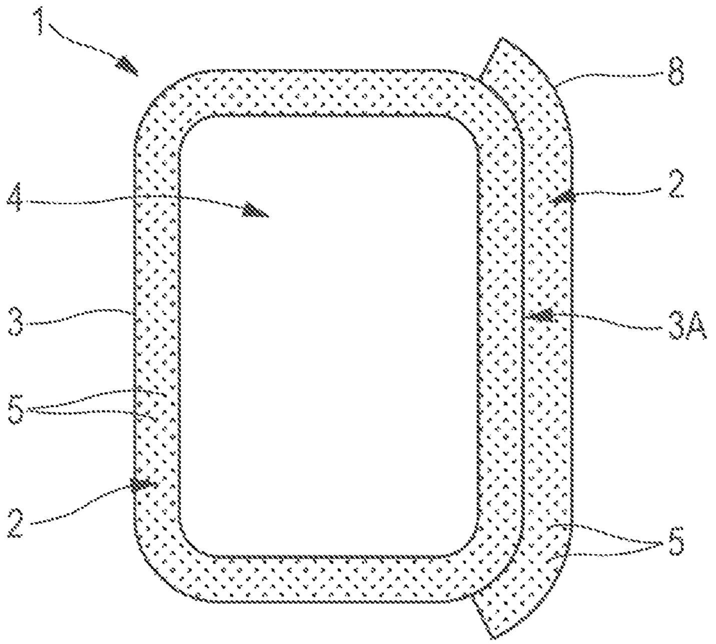
FIG. 3 is a view similar to that of FIG. 1 in which the tank comprises, in addition, a gaseous hydrogen capture system arranged in a thermal insulation outer jacket.

The tank 1 schematically represented in particular embodiments in FIGS. 1 to 3 and used to illustrate the invention is a hydrogen tank which is provided with at least one gaseous hydrogen capture system 2.

Although not exclusively, the tank 1 is preferably a liquid hydrogen tank for the storage of liquid hydrogen at low pressure in cryogenic condition. Such a liquid hydrogen tank is, notably, suitable for equipping a moving craft operating, at least partially, on hydrogen. Preferably, the tank 1 is intended to equip an aircraft (not represented), in particular, a transport airplane.

As represented very schematically in FIG. 1, the tank 1 is provided with a wall 3 delimiting, by its inner face 3B, a closed internal space 4. This closed internal space 4 is able to receive hydrogen, and notably liquid hydrogen. The tank 1 also comprises all the usual means which are necessary to its operation. These usual means do not directly form a part of the subject of the invention, so they are not represented and are not described further.

In the following description, the term "outer" is understood to mean outside or toward the outside of the tank, in the direction illustrated by arrows E in FIG. 1, and "inner" is understood to mean inside or toward the inside of the tank 1, in the direction opposite to the direction of the arrows E.

According to the invention, the tank 1 comprises one or more gaseous hydrogen capture systems 2. Each gaseous hydrogen capture system 2 is provided with absorbent fillers 5. These absorbent fillers 5 are components (that is to say, individual elements or particles) which simultaneously exhibit a high porosity and a high specific surface. It is known that these characteristics (of high porosity and exchange surface), when they are associated with particular chemical characteristics (for the components) allowing a chemical interaction with the hydrogen, create a gaseous hydrogen capture capability.

In the context of the present invention, the gaseous hydrogen capture system 2, that is to say, the absorbent fillers 5, can be arranged at different points relative to the tank 1, and, in particular, in at least a part of the wall 3 of the tank 1, on the tank 1 or around the tank 1, as specified hereinbelow.

Preferably, the absorbent fillers 5, not directly incorporated in the wall 3 of the tank 1, are arranged as close as possible to the (hydrogen) tank 1 so as to absorb the gaseous hydrogen escaping from the tank 1 in case of leaks therefrom.

Thus, there are provided, on the (hydrogen) tank 1, absorbent fillers 5, which are able to absorb, that is to say, retain and store, gaseous hydrogen which might have escaped from the tank 1 so as to prevent it from being given off into the environment of the tank 1, for example in an aircraft in the case of a hydrogen tank of an aircraft. Furthermore, through the use of absorbent fillers 5, the weight of the gaseous hydrogen capture system 2 is reduced, and notably acceptable for the application envisaged on an aircraft. The gaseous hydrogen capture system 2 has other advantages specified hereinbelow.

The absorbent fillers 5 are therefore components that have a great specific surface. It is known that the solid-state materials which comprise pores of a size typically less than 9 Å, combined with a high specific surface and a specific surface activation, offer the highest hydrogen storage levels.

In a preferred embodiment, the absorbent fillers 5 are produced in one of the following materials having a significant exchange specific surface: porous carbonated elements, metal-organic frameworks, covalent organic frameworks.

It is known that, by virtue of the combined effects of a high specific surface and a high porosity, active carbon (or activated carbon) exhibits a high gravimetric gaseous hydrogen storage capacity. The activated carbon can, for example, be derived from a preparation from cellulose acetate.

Furthermore, the covalent organic frameworks (or networks) COF represent a class of materials which form two-dimensional or three-dimensional structures by reactions between organic precursors resulting in strong covalent bonds to form porous, stable and crystalline materials.

Moreover, the metal-organic frameworks (or networks) MOF are compounds composed of metal ions or coordinated clusters with organic ligands to form structures in one, two or three dimensions, which are highly porous. These compounds comprise a coordination network in which clusters of metal atoms are bonded together by organic molecules so as to form a network, the periodic structure of which, which has one, two or three dimensions, comprises empty spaces to allow the storage of gas, and notably of gaseous hydrogen.

In a particular embodiment, the gaseous hydrogen capture system 2 can comprise absorbent fillers 5, of which some are produced in a first material and others are produced in a second material different from the first material. Production with more than two different materials can also be envisaged.

In the context of the present invention, the gaseous hydrogen capture system 2, that is to say, the absorbent fillers 5, can therefore be arranged at different points relative to the tank 1. In the examples of FIGS. 1 to 3, the absorbent fillers 5 are represented schematically by dots.

In a first embodiment, the gaseous hydrogen capture system 2 comprises absorbent fillers 5 which are linked to at least a part of the wall 3 of the tank 1. In the example represented in FIG. 1 of this first embodiment, the absorbent fillers 5 are linked to the entire wall 3 of the tank 1, by being embedded in the material 6 of the wall 3. In this example, the absorbent fillers 5 are therefore directly incorporated in the wall 3 of the tank 1. Different possible modes of integration are described hereinbelow in the case of a wall made of composite material.

In a variant production of this first embodiment, the absorbent fillers 5 can also be incorporated in the outer face 3A of the wall 3. In this case, the absorbent fillers are, preferably, scattered directly on the outer face 3A of the wall 3 of the tank 1 before the last polymerization step such that the outer surface 3A retains an adhesion power to allow sufficient adhesion of the absorbent fillers 5.

Moreover, in a second embodiment, represented in FIG. 2, as a variant of or complementing the first embodiment, the gaseous hydrogen capture system 2 comprises absorbent fillers 5 which are linked to a skin (or shell) 7 arranged on at least a part of the outer face 3A of the wall 3 of the tank 1. In the example of FIG. 2, the skin 7 surrounds the entire outer face 3A of the wall 3. The skin 7 is, for example, produced in thermoplastic resin. In this example, the absorbent fillers 5 are therefore directly incorporated in the skin 7.

Moreover, a third embodiment, represented in FIG. 3, applies to a hydrogen tank 1 which comprises an outer jacket 8 intended to implement an auxiliary function. In a preferred embodiment, this auxiliary function is a thermal insulation function. In this third embodiment, the gaseous hydrogen capture system 2 comprises absorbent fillers 5 which are linked to the jacket 8 (preferably thermal insulation jacket). In the example represented in FIG. 3, the jacket 8 partly covers the outer face 3A of the wall 3 of the tank 1. In a variant, the jacket 8 can cover the entire outer face 3A of the wall 3 of the tank 1.

In the example represented in FIG. 3, the tank 1 comprises a first gaseous hydrogen capture system 2 according to the third embodiment which is incorporated in the outer jacket 8, and a second gaseous hydrogen capture system 2 according to the first embodiment which is incorporated in the wall 3 of the tank 1.

In the context of the present invention, only any one of the abovementioned three embodiments, or simultaneously any two of these embodiments or all three of the embodiments can be implemented on a tank 1 for capturing liquid hydrogen.

Figure 4:
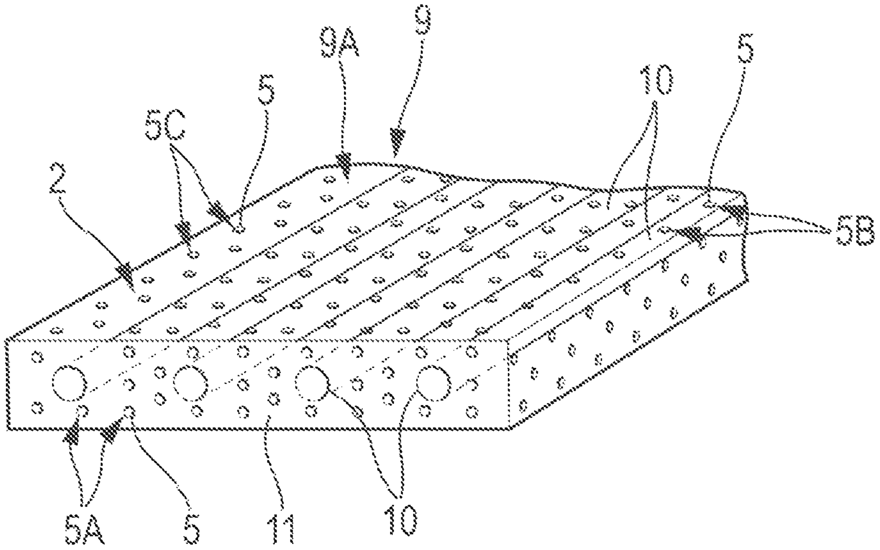
FIG. 4 is a partial view, in perspective, of a composite material comprising absorbent fillers.

Moreover, in a preferred embodiment, the hydrogen tank 1 comprises at least one composite material 9 represented in FIG. 4. The composite material 9 can correspond to the material used to produce the wall 3 of the tank 1 and/or the material used to produce the outer jacket 8 (thermal insulation jacket). The composite material 9 comprises, in the usual manner and not described further, fibers 10 which are embedded in a resin 11, for example made of thermoplastic or thermosetting polymer, as represented schematically in FIG. 4. The fibers 10 can form a woven or non-woven reinforcement (of fibers). The fibers 10 can correspond, for example, to carbon, glass, or other such fibers, or to natural fibers such as linen fibers.

In this preferred embodiment, the composite material 9 comprises absorbent fillers 5 which are differentiated from one another, as a function of their location in the composite material 9, by the addition respectively of the letters A, B and C. The absorbent fillers 5 are represented by circles in FIGS. 4 to 6.

Different productions can be envisaged for the implementation of this preferred embodiment. According to a first production, absorbent fillers 5A are embedded in the resin 11 of the composite material 9, as represented in FIG. 4.

Furthermore, according to a second production, as a variant of or complementing the first embodiment, absorbent fillers 5B are incorporated in fibers 10 of the composite material 9. In this case, the absorbent fillers 5B can be either incorporated in the material of the fibers 10, or be arranged on the surface of the fibers 10.

Moreover, according to a third production, as a variant of or complementing the first and/or second productions, absorbent fillers 5C are deposited on at least one surface 9A of the composite material 9.

The example of FIG. 4 therefore simultaneously comprises these three embodiments. Obviously, the composite material 9 can comprise only one of these embodiments or two embodiments.

In a particular embodiment, to allow a good adhesion of the absorbent fillers 5, notably when they are arranged on the surface of the material considered, for example on the surface 9A of the composite material 9, the absorbent fillers 5 are incorporated in particles (not represented) of thermosetting or thermoplastic polymers. A good adhesion of the absorbent fillers is thus obtained via these polymers.

Moreover, in a particular embodiment which applies more particularly to the outer jacket 8 (FIG. 3), although it can also be applied to the wall 3, a laminated composite 12 (FIGS. 5 and 6), provided with one or more so-called composite layers, is provided. Each of these composite layers 13, 14 is formed, in the usual manner, by a plurality of plies P1 to P4 (FIG. 5), P5 to P7 (FIG. 6), preferably unidirectionally.

Figure 5:
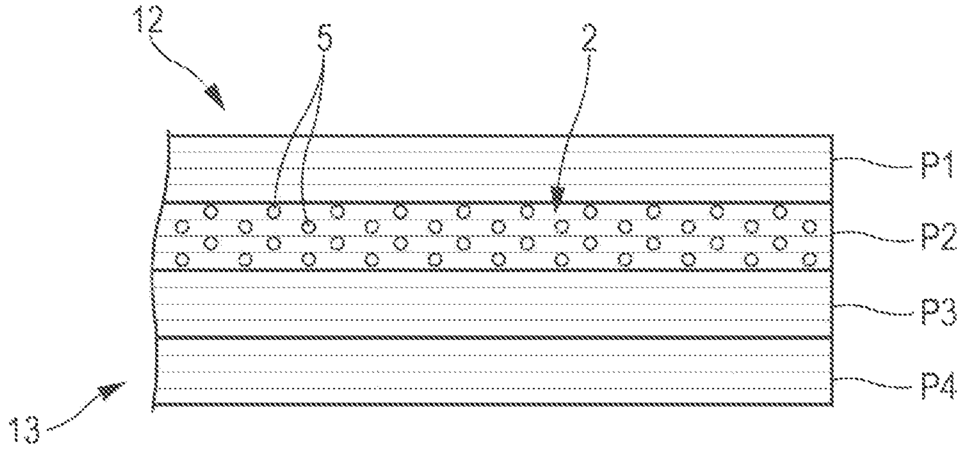
FIG. 5 is a schematic view, partial and in cross-section, of a laminated composite provided with a plurality of plies, comprising absorbent fillers incorporated in one of the plies.

In a first production of this particular embodiment, represented in FIG. 5, absorbent fillers 5 are directly incorporated in at least one of the plies, in this case in the ply P2 of the composite layer 13 of the laminated composite 12. The absorbent fillers 5 are directly incorporated in the polymer matrix constituting the ply P2 of the laminated composite 12.

Figure 6:
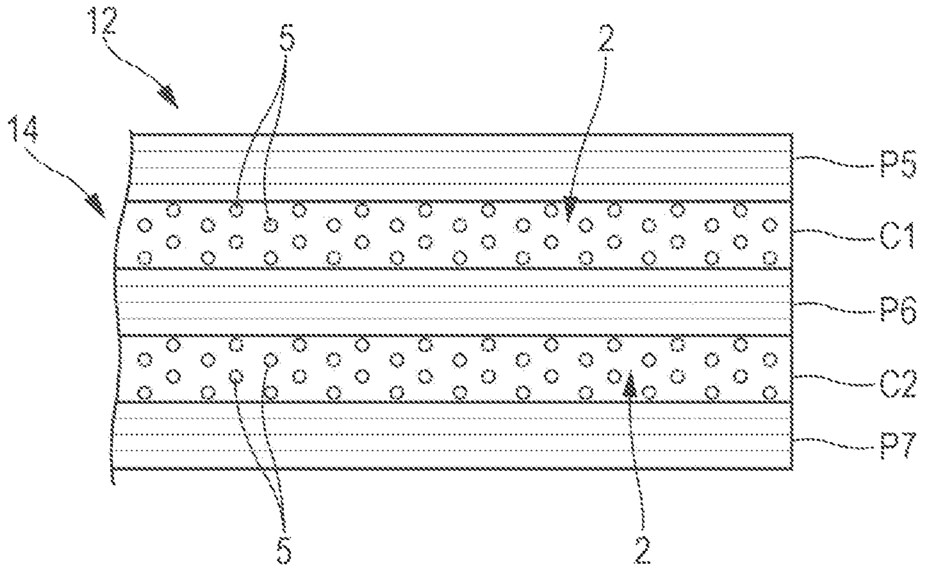
FIG. 6 is a schematic view, partial and in cross-section, of a laminated composite provided with a plurality of plies, comprising absorbent layers provided with absorbent fillers, which are arranged each time between two successive plies.

Furthermore, in a second production of this particular embodiment, represented in FIG. 6, absorbent fillers 5 are incorporated in at least one so-called absorbent layer C1, C2. In the example of FIG. 6, absorbent fillers 5 are incorporated, on the one hand, in the absorbent layer C1 which is arranged between the two successive plies P5 and P6 of the composite layer 14 and, on the other hand, in the absorbent layer C2 which is arranged between the two successive plies P6 and P7 of the composite layer 14. The absorbent fillers 5 incorporated in the layer C1 and/or C2 could also deflect any cracks appearing and thus act as a barrier against the propagation of these cracks, rendering the structure more tolerant to damage.

The number of absorbent layers C1 and C2 is adapted to optimize the capture capacity and/or to optimize the overall properties of the laminated composite 12. The thickness of each of the absorbent layers C1 and C2 and the density of absorbent fillers 5 can also be optimized to obtain the capture capacities sought and to optimize the tolerance to damage.

For the production of the laminated composite 12, the absorbent fillers 5 can be either directly deposited on the surface of a unidirectional ply before the production of the laminated composite, or incorporated beforehand in a film or in a thermosetting or thermoplastic polymer film or shell which is then deposited on a ply of the laminated composite 12 before the lamination.

In the case of the application of the laminated composite 12 to the jacket 8, the different constituent layers of the jacket 8 can be separated by a skin such as the skin 7 (FIG. 2).

Thus, a functionalization of the laminated composite is produced for the capture of gaseous hydrogen in an application to a tank 1 for the storage of hydrogen (at low pressure) in cryogenic condition. In particular, functionalized layers are produced that can potentially be incorporated in an outer layer of the laminated compound or within the laminated composite for the recovery of the liquid hydrogen released in line with the transverse cracks in the adjacent plies.

The gaseous hydrogen capture system 2 (comprising the absorbent fillers 5) offers the advantage, on the one hand, of being able to incorporate, easily without the addition of complex (and heavy) devices such as pumps, a vector gas and a pipeline, and, on the other hand, is incorporated perfectly in the composite material. Furthermore, the layers incorporated in the composite material offer an advantage with respect to the tolerance to damage, as barrier for deflecting transverse cracks emerging at the interfaces, and/or by the addition of a polymer of thermoplastic nature with fillers at the interface.

In a preferred embodiment, the absorbent fillers 5 are distributed uniformly in the material in which they are incorporated, for example in the resin 11 of a composite material 9, in the skin 7 or in the jacket 8. Such a uniform distribution of the absorbent fillers 5 makes it possible to optimize and make uniform the capture properties of the system 2.

Furthermore, in a particular embodiment, the density of the absorbent fillers 5 is optimized to obtain the capture capacity sought for the corresponding system 2.

In order to more effectively stop a hydrogen leak, the absorbent fillers 5 are, preferably, concentrated in the tank 1 or as close as possible to the tank 1. However, the capture (or catchment) capacity of the absorbent fillers 5 being (notably) a function of the temperature, the absorbent fillers 5 are preferably arranged in order for their capture capacity to be the most optimal that it can possibly be.

More specifically, since the absorbent fillers 5 exhibit a variable efficiency as a function of the temperature of their environment and since, generally, the temperature is also variable at the tank 1 (and lies within a known range of temperatures), with the temperature increasing with distance away from the tank 1 (in cryogenic operation), the absorbent fillers 5 are arranged on the tank 1 (notably according to one of the embodiments described above) at locations where the temperature is such that the absorbent fillers 5 exhibit the highest efficiency for the range of temperatures.

In the context of the present invention:

- the tank 1 is, preferably, a tank comprising a wall 3 produced in a composite material, notably laminated, this wall 3 being provided preferably with absorbent fillers 5 according to one or more of the embodiments described above. This tank 1 can also be provided with a skin 7 with absorbent fillers 5 and/or a jacket 8 (in particular a thermal protection jacket) with absorbent fillers 5;
- the tank 1 can also comprise a wall which does not include absorbent fillers 5, for example a metal wall. In this case, the system 2 (provided with the absorbent fillers) can be incorporated in a skin 7 and/or in a jacket 8 (in particular a thermal protection jacket) linked to the tank 1.

The present invention thus offers a wide variety of possible different embodiments (which can, in addition, be combined) and, consequently, great flexibility of incorporation of the absorbent fillers 5 for generating the gaseous hydrogen capture system or systems 2 associated with the tank 1.

The absorbent fillers 5, in addition to being able to capture the gaseous hydrogen and having a reduced weight, also offer the advantage of being able to release the gaseous hydrogen previously captured.

To this end, a method for restoring gaseous hydrogen is also provided. This method is configured to restore the gaseous hydrogen captured by absorbent fillers 5 of the tank 1 as described above.

For this, the method comprises at least one restoration step. This restoration step consists in bringing the gaseous hydrogen capture system 2 provided with the absorbent fillers 5 into particular conditions automatically generating a release of the gaseous hydrogen captured previously by the absorbent fillers 5. Preferably, all the part of the system or of the mobile vehicle, and notably of the aircraft, which comprises the tank 1, is brought into these particular conditions.

The restoration step comprises at least one of the following operations:

- a temperature increasing operation;
- a pressure reducing operation;
- a neutral gas diffusion operation;
- an operation leading to the modification of the polarity of the inner wall of the pores of the porous absorbent fillers 5.

The temperature increasing operation consists in increasing the temperature of the abovementioned part (comprising the tank 1) to a temperature such that the absorbent fillers 5 of the system 2 directly release the gaseous hydrogen that has been captured and stored.

Similarly, the pressure reducing operation comprises reducing the pressure of the abovementioned part (comprising the tank 1) to a pressure such that the absorbent fillers 5 of the system 2 directly release the gaseous hydrogen that has been captured and stored. This reduction of the pressure can, for example, be obtained by generating a low vacuum at the part, or simply induced by the pressure reduction generated by the displacement of the hydrogen on the structure, notably during take-off or landing, and for certain flight phases associated with the weather conditions.

Furthermore, regarding the diffusion operation, the gas (preferably a neutral gas) is diffused so as to graze the surface of the tank 1, of the skin 7 or of the outer jacket 8 (thermal insulation jacket), so as to release the hydrogen atoms from the absorbent fillers 5. Preferably, a gas is used which does not react with the hydrogen and which is not hazardous for people and the environment. This gas can thus depollute the surface of the jacket 8 or of the tank 1.

Moreover, it is also possible to perform an operation leading to the modification of the polarity of the inner wall of pores of the absorbent fillers 5. This modification is obtained, either by a change of temperature, or by the action of an electrical current or of a magnetic field.

The gaseous hydrogen that is thus released by the absorbent fillers 5 of the system 2, which are brought to appropriate conditions, can be released into the environment which has been previously secured. This restoration method is for example performed, for a hydrogen tank of an aircraft, on the ground, after having emptied the aircraft of its passengers and having moved it to a secure spot or having removed the tank.

The gaseous hydrogen, thus released by the absorbent fillers 5 of the system 2, can also be recovered and reused, for example to feed a fuel cell or a battery. In this case, in the restoration step, means are provided that make it possible to capture the gaseous hydrogen released by the absorbent fillers 5 in such a way as to be able to store it to reuse it.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A hydrogen tank, comprising:

at least one gaseous hydrogen capture system provided with absorbent fillers in the form of particles which retain and store gaseous hydrogen, at least some of said absorbent fillers being embedded into, and distributed throughout, an entire wall of the tank and incorporated into, and distributed throughout, a skin arranged on an entire outer face of the tank, and at least one outer jacket, comprising a composite material, and configured to cover an entire outer face of the tank and implement a thermal insulation function, the at least one jacket including the absorbent fillers being embedded into, and distributed throughout, an entirety of the at least one outer jacket.

2. The hydrogen tank as claimed in claim 1, further comprising at least one composite material provided with fibers, and wherein at least some of said absorbent fillers are incorporated in at least some of the fibers of the composite material.

3. The hydrogen tank as claimed in claim 1, further comprising at least one composite material provided with resin, and wherein at least some of said absorbent fillers are embedded in the resin of the composite material.

4. The hydrogen tank as claimed in claim 1, further comprising at least one composite material, and wherein at least some of said absorbent fillers are deposited on at least one surface of the composite material.

5. The hydrogen tank as claimed in claim 1, further comprising at least one laminated composite provided with at least one composite layer formed by plies, and wherein at least some of said absorbent fillers are incorporated in at least one absorbent layer arranged between two successive plies of the composite layer.

6. The hydrogen tank as claimed in claim 1, further comprising at least one laminated composite provided with at least one composite layer formed by plies, and wherein at least some of said absorbent fillers are incorporated in at least one of said plies.

7. The hydrogen tank as claimed in claim 1, wherein the gaseous hydrogen capture system comprises particles of thermosetting or thermoplastic polymers which comprise at least some of said absorbent fillers.

8. The hydrogen tank as claimed in claim 1, wherein the absorbent fillers are distributed uniformly.

9. The hydrogen tank as claimed in claim 1, wherein the absorbent fillers exhibit a variable effectiveness as a function of temperature, wherein a temperature in the hydrogen tank is variable and lies within a temperature range, and wherein the absorbent fillers are arranged on the tank at locations where the temperature is such that the absorbent fillers exhibit a highest effectiveness for said temperature range.

10. The hydrogen tank as claimed in claim 1, wherein the absorbent fillers are produced in at least one of the following materials: porous carbonated elements, metal-organic frameworks, and covalent organic frameworks.

11. A method for restoring gaseous hydrogen captured by absorbent fillers of a hydrogen tank as claimed in claim 1, comprising at least one restoration step comprising bringing the gaseous hydrogen capture system provided with the absorbent fillers of said hydrogen tank into conditions generating a release of the gaseous hydrogen absorbed previously by said absorbent fillers.

12. The method as claimed in claim 11, wherein the restoration step comprises at least one of the following operations, implemented at least on the gaseous hydrogen capture system:

a temperature increasing operation;

a pressure reducing operation;

a gas diffusion operation;

an operation leading to a modification of a polarity of an inner wall of pores of the porous absorbent fillers.

13. The hydrogen tank as claimed in claim 1, wherein the composite material of the jacket is provided with fibers, and wherein at least some of the absorbent fillers of the jacket are incorporated in at least some of the fibers of the composite material.

14. The hydrogen tank as claimed in claim 1, wherein the composite material of the jacket is provided with resin, and wherein at least some of the absorbent fillers of the jacket are embedded in the resin of the composite material.

15. The hydrogen tank as claimed in claim 1, wherein the composite material of the jacket is at least one laminated composite provided with at least one composite layer formed by plies, and wherein at least some of the absorbent fillers of the jacket are incorporated in at least one absorbent layer arranged between two successive plies of the composite layer.

* * * * *